UNITED STATES PATENT OFFICE 2,247,196

ENAMEL

Raymond W. Goodwin, Cleveland Heights, Ohio, assignor to General Electric Company, a corporation of New York No Drawing. Application March 11, 1939, Serial No. 261,387

5 Claims. (Cl. 106—48)

My invention relates to enamels or glazes generally, and more particularly to enamels which are suitable for application to the glass bulbs or envelopes of electric lamps.

One of the objects of my invention is to provide enamels suitable for application to the interior surfaces of the envelopes of tubular lamps, such as those shown in Patent 2,032,791, P. O. Cartun, which enamels will have a low firing temperature to avoid deformation of the tubular envelopes upon firing, coupled with such a coefficient of expansion that the enamelled envelopes will be strong enough to withstand the mechanical shocks incidental to manufacture and use of the finished lamps. Another object is to provide enamels having these desirable characteristics without the use of lead or compounds of lead as a batch constituent.

According to my invention, I substitute the oxides of barium, calcium, cadmium, zinc and boron in suitable combinations of some or all of these oxides in the place of lead oxide.

The silicon dioxide content of the enamel may vary from about 8 per cent to 32 per cent, and aluminum oxide may vary from 1 per cent to 6 per cent. The boric oxide content may vary from 10 per cent to 45 per cent; it is used to lower the firing temperature and to obtain satisfactory coefficients of expansion.

Opacity in white enamels is preferably obtained by the use of oxides of arsenic or antimony. The content of antimony oxide may vary from 4 per cent to 12 per cent.

Chemical stability may be increased by the use of zirconium oxide in amounts up to 6 per cent and is useful in enamels for exteriorly coated lamps to resist weathering.

Zinc oxide is useful in attaining a low melting point coupled with a low coefficient of thermal expansion, and may vary in amount from 0 per cent to 24 per cent.

A characteristic of these enamels is a sufficiently low firing temperature obtained without excessive use of alkali oxides. The content of alkali oxides preferably should not exceed 10 per cent.

Some fluxing action is obtained by the use of fluorspar in amounts up to 6 per cent. In some cases 2 per cent of sodium silicofluoride is added for the same purpose.

A feature of this invention is the use of small amounts of nitrate, such as lithium nitrate, as a mill addition. When small amounts of lithium nitrate are added to the mill batch, clean bright colors are obtained. Other nitrates which may be used are sodium and ammonium nitrates, but the lithium salt is preferred.

It will be understood that the above references to constituent oxides have been made with a view to the final analysis of the enamel without reference to the batch ingredient used to introduce a given oxide. For instance, zirconium oxide may be introduced not only as the oxide, but also in any of its compounds or commercially prepared mixtures, such as the double zirconium silicates of zinc, barium, calcium and others, or as calcium or barium zirconates.

The following are batch compositions of preferred enamels comprising my invention:

| No. | 154 | 157 | 173 | 185 | T3 |
|---|---|---|---|---|---|
| | Percent | Percent | Percent | Percent | Percent |
| Silica | 11 | | 16.6 | 16.6 | |
| Feldspar | 10 | 10 | 5.0 | 5.0 | |
| BaZrSiO₅ | 8.5 | | | | |
| CaZrSiO₅ | 6.0 | 8 | | | |
| NaSbO₃ | 14.5 | 14 | 5.0 | 7.0 | 14.0 |
| Ba(NO₃)₂ | 6.0 | | 4.0 | 4.0 | |
| BaCO₃ | 6.0 | 5.4 | | 12.4 | 5.0 |
| CdO | | | 5.0 | 5.0 | |
| ZnO | 6.0 | 12.3 | 10.0 | 4.0 | 11.5 |
| CaF₂ | 4.0 | 4.0 | 6.0 | 6.0 | 6.0 |
| Na₂SiF₆ | 2.0 | 2.0 | 2.0 | | |
| Na₂CO₃ | 9.0 | | 5.0 | | |
| K₂CO₃ | | | | | |
| Li₂CO₃ | 4.5 | | 2.5 | 7.5 | 4.0 |
| KNO₃ | | 5.6 | 4.3 | 7.0 | |
| B₂O₃ | 37.0 | 43.0 | 43.0 | | |
| H₃BO₃ | | | | 78.0 | 80.0 |
| Pyrophillite (Pyrax A) | | | | | 9.0 |
| ZnZrSiO₅ | | | | | 9.0 |
| LiNO₃ | | | | | 7.0 |

The enamel may be prepared by thoroughly mixing the batch ingredients and then feeding them into a continuous furnace to melt the batch. The batch is run from the furnace into water to shatter it, after which it is dried and then ground in a ball mill.

The calculated analyses of enamels made from the above batches are as follows:

| No. | 154 | 157 | 173 | 185 | T3 |
|---|---|---|---|---|---|
| | Percent | Percent | Percent | Percent | Percent |
| SiO₂ | 18.2 | 8.7 | 20.0 | 19.0 | 8.2 |
| Sb₂O₃ | 10.7 | 12.0 | 4.0 | 5.7 | 11.9 |
| Al₂O₃ | 1.8 | 2.0 | 1.0 | 1.0 | 2.0 |
| ZrO₂ | 5.4 | 4.0 | | | 4.1 |
| BaO | 10.5 | 4.2 | 2.4 | 11.3 | 3.9 |
| CaO | 1.1 | 1.8 | | | |
| CdO | | | 5.0 | 4.7 | |
| ZnO | 5.3 | 12.3 | 10.0 | 3.8 | 14.1 |
| CaF₂ | 3.6 | 4.0 | 6.0 | 5.6 | 6.0 |
| Na₂SiF₆ | 1.8 | 2.0 | 2.0 | | |
| Na₂O | 7.8 | 2.0 | 4.2 | 1.5 | 2.0 |
| K₂O | | 4.0 | 2.0 | 3.0 | |
| Li₂O | 1.6 | | 1.0 | 2.8 | 3.0 |
| B₂O₃ | 32.4 | 43.0 | 42.4 | 41.6 | 44.7 |

Colored enamels may be produced by adding the proper "color oxides" as mill additions to the enamels listed above. Some well-known coloring materials are cadmium sulphide, cadmium-selenium sulphide and calcines of cobalt.

The enamel identified above as No. 185 has been employed with good results as a coating for the inner surface of tubular envelopes of incandescent lamps. This enamel has a coefficient of expansion of about $70.5$–$73.8 \times 10^{-7}$ which is somewhat lower than that of the lead glass envelopes (about $88 \times 10^{-7}$). The No. 154 enamel may be employed to advantage to coat the exterior surfaces of lamp bulbs of the well-known globular or pear-shape.

What I claim as new and desire to secure by Letters Patent of the United States is:

1. An enamel free from lead and having a firing temperature and coefficient of expansion adapting it for application to the surfaces of glass electric lamp envelopes comprising about 19 per cent $SiO_2$, 5.7 per cent $Sb_2O_5$, 1 per cent $Al_2O_3$, 11.3 per cent BaO, 4.7 per cent CdO, 3.8 per cent ZnO, 5.6 per cent $CaF_2$, 1.5 per cent $Na_2O$, 3 per cent $K_2O$, 2.8 per cent $LiO_2$ and 41.6 per cent $B_2O_3$.

2. An enamel free from lead and having a firing temperature and coefficient of expansion adapting it for application to the surfaces of glass electric lamp envelopes comprising about 18.2 per cent $SiO_2$, 10.7 per cent $Sb_2O_5$, 1.8 per cent $Al_2O_3$, 5.4 per cent $ZrO_2$, 10.5 per cent BaO, 1.1 per cent CaO, 5.3 per cent ZnO, 3.6 per cent $CaF_2$, 1.8 per cent $Na_2SiF_6$, 7.8 per cent $Na_2O$, 1.6 per cent $LiO_2$ and 32.4 per cent $B_2O_3$.

3. An enamel free from lead and having a firing temperature and coefficient of expansion adapting it for application to the surfaces of glass electric lamp envelopes comprising about 8–20% $SiO_2$, 4–12% $Sb_2O_5$, 1–2% $Al_2O_3$, 0–6% ZrO, Ba and ZnO in a combined amount of about 12–18%, 0–2% CaO, 0–5% CdO, 3–6% $CaF_2$, 0–2% $Na_2SiF_6$, 2–10% alkali oxides, and 30–45% $B_2O_3$.

4. An enamel free from lead and having a firing temperature and coefficient of expansion adapting it for application to the surfaces of glass electric lamp envelopes comprising about 19–20% $SiO_2$, 4–6% $Sb_2O_5$, 1% $Al_2O_3$, 2–12% BaO, 4–5% CdO, 3–10% ZnO, 5–6% $CaF_2$, 0–2% $Na_2SiF_6$, $Na_2O$ and $K_2O$ in a combined amount of about 7%, 1–3% $LiO_2$, and 41–43% $B_2O_3$.

5. An enamel free from lead and having a firing temperature and coefficient of expansion adapting it for application to the surfaces of glass electric lamp envelopes comprising about 19% $SiO_2$, 5.7% $Sb_2O_5$, 1% $Al_2O_3$, 11.3% BaO, 4.7% CdO, 3.8% ZnO, 5.6% $CaF_2$, 7.3% alkali oxides and 41.6% $B_2O_3$.

RAYMOND W. GOODWIN.